US010091735B2

(12) United States Patent
Cozzo et al.

(10) Patent No.: US 10,091,735 B2
(45) Date of Patent: Oct. 2, 2018

(54) SYSTEMS AND METHODS FOR POWER CONTROL IN WIRELESS NETWORKS

(71) Applicant: FutureWei Technologies, Inc., Plano, TX (US)

(72) Inventors: Carmela Cozzo, San Diego, CA (US); Xueli Ma, Shanghai (CN); Fan Wang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 58 days.

(21) Appl. No.: 14/105,804

(22) Filed: Dec. 13, 2013

(65) Prior Publication Data
US 2014/0171081 A1 Jun. 19, 2014

Related U.S. Application Data

(60) Provisional application No. 61/736,998, filed on Dec. 13, 2012.

(51) Int. Cl.
*H04W 52/24* (2009.01)
*H04W 52/14* (2009.01)

(52) U.S. Cl.
CPC ....... *H04W 52/146* (2013.01); *H04W 52/241* (2013.01); *H04W 52/242* (2013.01); *H04W 52/244* (2013.01)

(58) Field of Classification Search
CPC ... H04W 92/02; H04W 84/045; H04W 36/30; H04W 36/04; H04W 16/32
USPC ........................................................ 455/444
See application file for complete search history.

(56) References Cited

U.S. PATENT DOCUMENTS

| 8,594,716 B2* | 11/2013 | Watanabe et al. ............ 455/522 |
| 2003/0039217 A1 | 2/2003 | Seo et al. |
| 2003/0114181 A1* | 6/2003 | Lee ........................ H04W 52/16 455/522 |
| 2003/0232622 A1 | 12/2003 | Seo et al. |
| 2004/0058700 A1* | 3/2004 | Nilsson et al. ............... 455/522 |

(Continued)

FOREIGN PATENT DOCUMENTS

| CN | 1917393 A | 2/2007 |
| EP | 1341318 A2 * | 9/2003 |
| WO | 2012112868 A1 | 8/2012 |

OTHER PUBLICATIONS

Huawei, et al., "Overview of UMTS Heterogeneous Networks," 3GPP TSG-RAN WG1 Meeting #70bis, R1-124467, San Diego, USA Oct. 8-12, 2012, 9 pages.
3GPP, 3rd Generation Partnership Project; Technical Specification Group RAdio Access Network; Study on UMTS Heterogeneous Networks (Release 12), 3GPP TR 25.800 v2.0.0, Aug. 2013, 24 pages.

(Continued)

*Primary Examiner* — Marisol Figueroa
(74) *Attorney, Agent, or Firm* — Slater Matsil, LLP

(57) ABSTRACT

Embodiments are provided for adjusting a transmission power level at a user equipment (UE). An embodiment method by a network includes sending, to the UE, a first indication for a transmission power level. The transmission power level is for a transmission from the UE to a base station. The method further includes sending a second indication for the transmission power to the base station. The UE receives the indication for the transmission power level, and applies the transmission power level on uplink from the UE to the base station. The UE is located between the base station and a radio node and transmits on uplink to the base station and the radio node.

16 Claims, 6 Drawing Sheets

(56) References Cited

U.S. PATENT DOCUMENTS

| | | | |
|---|---|---|---|
| 2005/0043052 A1* | 2/2005 | Whinnett | H04W 52/32 |
| | | | 455/522 |
| 2005/0136959 A1* | 6/2005 | Hellwig et al. | 455/522 |
| 2008/0039128 A1* | 2/2008 | Ostman et al. | 455/522 |
| 2008/0051126 A1* | 2/2008 | Nagaraj | H04W 52/325 |
| | | | 455/522 |
| 2010/0273520 A1* | 10/2010 | Pelletier | H04L 5/0007 |
| | | | 455/522 |
| 2010/0303030 A1* | 12/2010 | Andersson | H04W 52/12 |
| | | | 370/329 |
| 2012/0157152 A1* | 6/2012 | Blomgren | H04W 52/146 |
| | | | 455/522 |
| 2012/0213092 A1* | 8/2012 | Sun et al. | 370/248 |
| 2012/0269166 A1 | 10/2012 | Chin et al. | |

OTHER PUBLICATIONS

Huawei, "Update of Technical Report on UMTS Heterogeneous Networks," 3GPP TSG-RAN WG1 Meeting #75 R1-135849, San Francisco, USA, Nov. 11-15, 2013, 172 pages.

Huawei, "Proposed SID: Study on UMTS Heterogeneous Networks," TSG-RAN Meeting #57, RP-121436, Chicago, USA, Sep. 4-7, 2012, 5 pages.

International Search Report and Written Opinion received in International Applicaiton No. PCT/US13/75125 dated Feb. 28, 2014, 7 pages.

3GPP, "3rd Generation Partnership Project; Technical Specification Group Radio Access Network; Physical channels and mapping of transport channels onto physical channels (FDD) (Release 12)," 3GPP TS 25.211 V12.1.0 Technical Specification, Dec. 2014, 19 pages.

* cited by examiner

SYSTEMS AND METHODS FOR POWER CONTROL IN WIRELESS NETWORKS

This application claims the benefit of U.S. Provisional Application No. 61/736,998 filed on Dec. 13, 2012 by Carmela Cozzo et al. and entitled "Systems and Methods for Power Control in Heterogeneous Networks," which is hereby incorporated herein by reference as if reproduced in its entirety.

TECHNICAL FIELD

The present invention relates to the field of wireless communications, and, in particular embodiments, to systems and methods for power control in wireless networks.

BACKGROUND

Mobile data traffic is growing quickly due to the increasing penetration of smart phones and the increasing use of data and video services. Deployment of heterogeneous networks (Hetnet) is considered a promising technology to meet the requirements in an efficient manner and with a relatively low cost. Hetnet is a mixed deployment of macro cells and low power nodes (LPNs), which are also called small cells. The transmit power of an LPN is smaller than the transmit power of the macro NodeB, and this causes an imbalance between the uplink and the downlink. For example, the user equipment (UE) position (relative to the location of the macro NodeB and LPN) where the UE signal is received with the same power at the macro and LPN (uplink (UL) boundary) is different from the position where the UE receives the downlink signals from both nodes at the same level (downlink (DL) boundary). In other words, at the DL boundary, the path loss from the UE to the macro NodeB is larger than the path loss to the LPN. There is then an imbalance between uplink and downlink, and consequently the uplink and downlink coverage will be different. There is a need for a scheme that controls the power transmission of the UE in such scenario or other scenarios of imbalance between the uplink and the downlink.

SUMMARY OF THE INVENTION

In accordance with an embodiment of the disclosure, a method by a network component for adjusting a transmission power level at a user equipment (UE) includes sending, to the UE, a first indication for a transmission power level. The transmission power level is for a transmission from the UE to a base station. The method further includes sending a second indication for the transmission power to the base station. The UE is located between the base station and a radio node and transmits on uplink to the base station and the radio node.

In accordance with another embodiment of the disclosure, a network component for adjusting a transmission power level at a UE includes at least one processor and a non-transitory computer readable storage medium storing programming for execution by the processor. The programming includes instructions to send, to the UE, a first indication for a transmission power level. The transmission power level is for a transmission from the UE to a base station serving the UE. A second indication for the transmission power is sent to the base station. The UE is located between the base station and a radio node and transmits on uplink to the base station and the radio node.

In accordance with another embodiment of the disclosure, a method by a UE for transmission power control includes receiving, from a network, an indication for a transmission power level. The transmission power level is for a transmission from the UE to a base station. The method further includes applying the transmission power level on uplink from the UE to the base station. The UE is located between the base station and a radio node and transmits on uplink to the base station and the radio node.

In accordance with yet another embodiment of the disclosure, a UE with adjustable transmission power control includes at least one processor and a non-transitory computer readable storage medium storing programming for execution by the processor. The programming includes instructions to receive, from a network, an indication for a transmission power level, wherein the transmission power level is for a transmission from the UE to a base station serving the UE. The UE is configured to apply the transmission power level on uplink from the UE to the base station. The UE is located between the base station and a radio node and transmits on uplink to the base station and the radio node.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
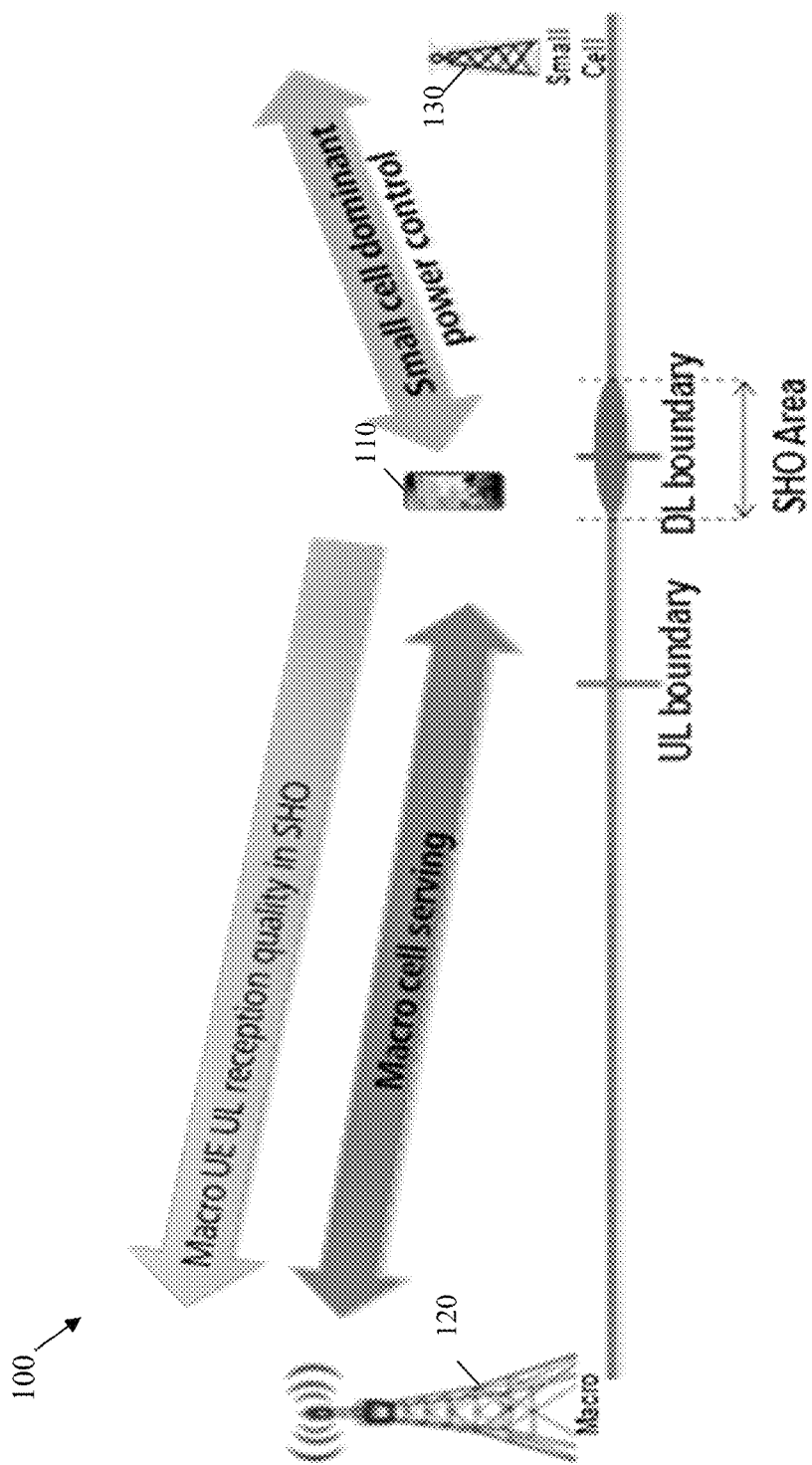
FIG. 1 illustrates an exemplary Hetnet scenario for a UE located in a soft handover (SHO) area.

Given a certain Hetnet deployment of macro cells and LPNs, depending on the UE position relative to the macro cell and the LPN, the interference environment can be very different. FIG. 1 illustrates a Hetnet scenario 100 where a UE 110 is located in the soft handoff (SHO) area, and the UE serving cell is a macro cell. The UE 110 can be a smartphone or any mobile user communications device. Being in SHO, the UE 110 transmit power is controlled by both the macro cell and a LPN 130. The UE 110 combines the power control commands received by a macro base station or NodeB 120 and the LPN 130. The LPN 130 is typically a smaller power base station or radio node than the NodeB 120. The UE 110 combines multiple power control commands received by multiple base stations (e.g., macro and LP nodes) while in SHO, by taking the "OR of the DOWNs of the received commands." Because the path loss to the LPN 130 is smaller than the path loss to the macro cell or NodeB 120, the LPN 130 is more likely to take control of the transmit power of the UE 110. In the power control procedure, the UE 110 decides the power level of the dedicated physical control channel (DPCCH) based on downlink power control commands. All other uplink channel power levels are derived as an offset from the DPCCH power level.

For example, when the UE 110 is in the SHO area as illustrated in FIG. 1, before the serving cell (macro cell) is changed to the LPN 130, if the transmit power difference between the macro cell and the LPN 130 is 6 dB, then the UL path loss difference at the DL boundary location is also 6 dB. This means that the UE 110 transmit power is controlled by the LPN 130 and the quality of reception is good at the LPN 130, while at the macro NodeB 120, the uplink signal is received at 6 dB lower power than at the LPN 130. As a result, the UL channel reception quality at the macro NodeB 120 is poor.

The uplink high speed dedicated physical control channel (HS-DPCCH) carries information related to the operation of the hybrid-automatic repeat request (H-ARQ) protocol (H-ARQ Acknowledgement, ACK signaling), and information related to the downlink channel conditions (channel quality indicator (CQI) signaling). The poor reception quality of the HS-DPCCH at the macro NodeB causes degradation in high speed downlink packet access (HSDPA) performance. Due to the UL/DL imbalance, the uplink DPCCH, carrying pilots and transmit power control (TPC) command, is kept at a relatively low level because of the power control procedure. This ensures that the DPCCH is received reliably at the LPN, but not necessarily at the macro NodeB. In turn, the reception quality of the HS-DPCCH at the macro NodeB may not fulfill the quality of service (QoS) of HS-DPCCH.

Embodiments are provided herein to improve the quality of the uplink signaling from a UE, e.g., when a UE in a Hetnet is in soft handover (SHO) and the serving cell is a macro cell. The methods are related to the modification of the current power control mechanism that adjusts the UE's transmission power on uplink. The methods can be implemented in co-channel deployment scenarios in Heterogeneous Networks, where both macro NodeBs and LPNs are deployed and they all use the same carrier frequency. The embodiments herein may also be implemented in any cellular networks and devices, such as universal mobile telecommunications system (UMTS) NodeBs, UEs, and the like. The methods described below can be extended to various scenarios, of different wireless network deployments or technologies, where a UE needs to transmit on uplink to multiple base stations that may be at different distances or have different power requirements.

In embodiments related to the signaling of the DPCCH power level, power control information is signaled to the UE by a radio network controller (RNC). The signaling can indicate an absolute power level or a relative power level to control the transmission power of DPCCH on uplink by the UE. The relative power level is an offset relative to the current DPCCH power level at the UE, which is previously set by a power control mechanism of the network. The relative power level (or offset power) is referred to herein a delta_DPCCH. In an embodiment, explicit signaling is used (e.g., from a RNC), where the signaled information includes the DPCCH power (absolute or relative power value). In another embodiment, implicit signaling is used, where the new DPCCH power is derived by the UE according to a signaled quantity other than explicit DPCCH power (absolute or relative power value), such as a new target signal to interference ratio (SIR), SIR_target.

In the case of using explicit signaling of absolute or offset power for DPCCH, a higher layer signaling, e.g., radio resource control (RRC) signaling, carries information about the DPCCH power. This may be a delta_DPCCH power, e.g., with respect to the current DPCCH power set at the UE by the current inner loop power control mechanism, or may be an absolute DPCCH power value. This scheme also includes indicating a SIR_target, for instance as an offset value, delta_SIR_target, or an absolute value for SIR_target. Specifically, the RNC signals an SIR_target value (or offset) to a base station (e.g., a macro cell NodeB), and signals a DPCCH power (absolute or offset value) to the UE. Upon receiving the signaled SIR_target value, the base station applies the indicated value, e.g., in the Outer Loop Power Control (OLPC) mechanism. Upon receiving the signaled DPCCH power, the UE applies the indicated offset or absolute power.

In another scheme, explicit signaling of absolute or offset power for DPCCH is sent to the UE using a higher layer signaling e.g., radio resource control (RRC) signaling from a RNC. Upon receiving the signaled DPCCH power, the UE derives the DPCCH power based on the indicated offset or absolute power. The UE applies the new DPCCH power N slots after the transmission time interval (TTI) boundary when the UE receives the message from the RNC, The value N can be any suitable value, for example 7.5 time slots. In this scheme, the RNC may also signal to the base station the absolute or offset value for SIR target, e.g., at about the same time of signaling the UE.

In yet another scheme, implicit signaling of absolute or offset power is sent to the UE using a higher layer signaling e.g., radio resource control (RRC) signaling from a RNC. Specifically, the RNC signals a SIR_target (absolute value signaling) or a change of SIR_target (offset value signaling) to the UE. Upon receiving the signaling for the SIR_target, the UE derives the DPCCH power based on the indicated SIR_target or change of SIR_target. For example, if a change of SIR_target, delta_SIR_target, is signaled, the UE interprets the change to be related to or a function of delta_DPCCH, for instance using delta_DPCCH=delta_SIR_target. The UE then applies the new derived DPCCH power N slots after the TTI boundary when UE receives the message from RNC, where N can be any suitable value (e.g., 7.5 slots).

Figure 2:
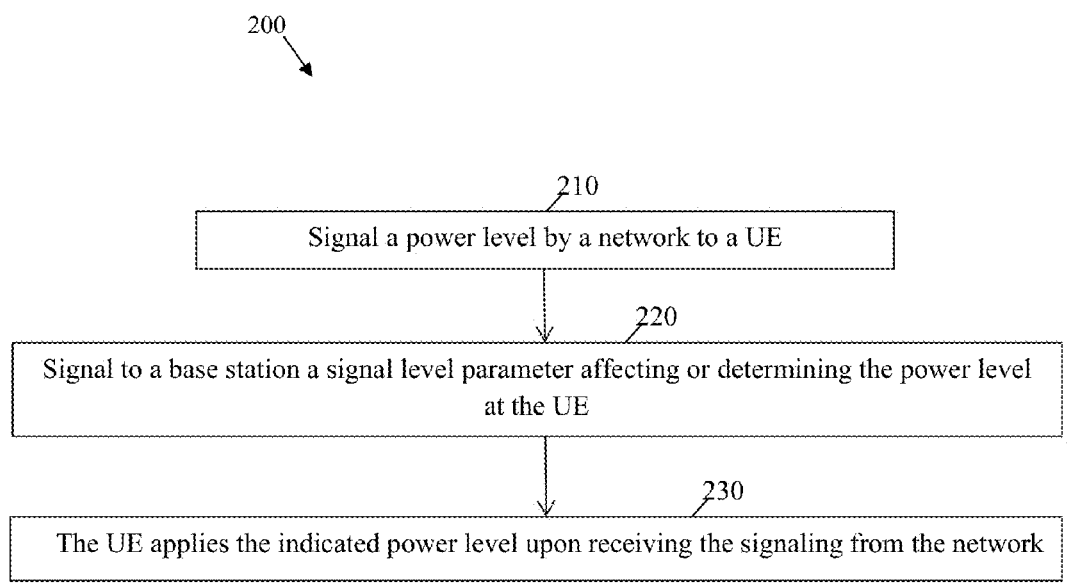
FIG. 2 illustrates an embodiment of a method for power control of UE transmissions.

FIG. 2 shows an embodiment of a method 200 for power control of UE transmissions. At step 210, a power level is signaled by a network to a UE. At step 220, a signal level parameter affecting or determining the power level at the UE is signaled to a base station, e.g., at about the same time as step 210. For instance, the RNC signals the UE an absolute DPCCH power level or an offset (delta_DPCCH) for adjusting the current DPCCH power at the UE. The RNC also signals, at about the same time, a macro NodeB an absolute SIR target value (SIR_target) or offset for adjusting the current SIR target at the NodeB. At step 230, the UE applies the indicated power level upon receiving the signaling from the network.

Figure 3:
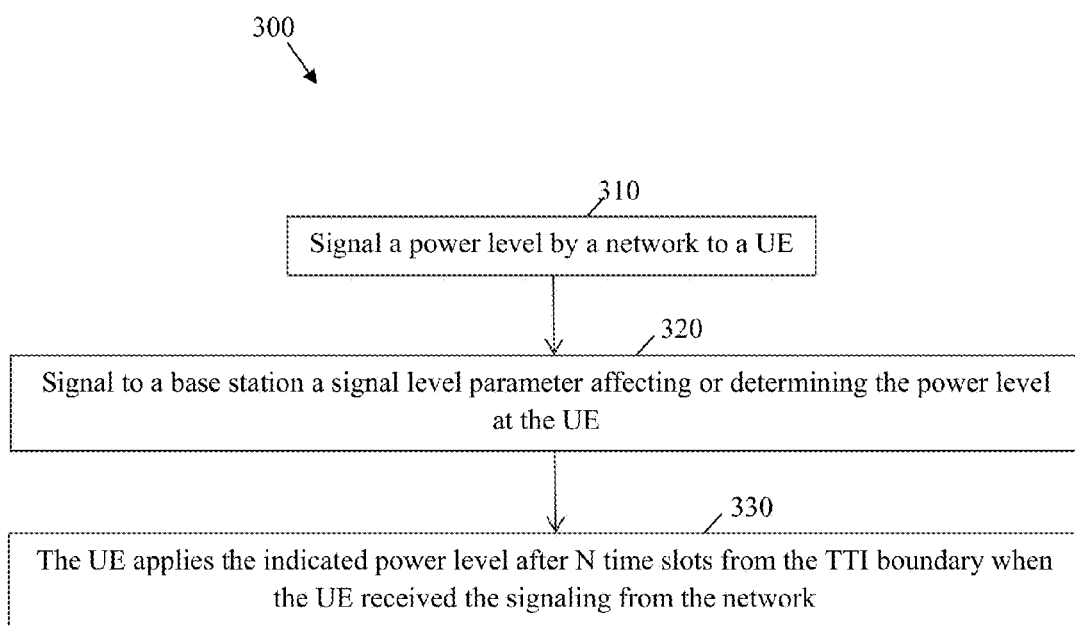
FIG. 3 illustrates another embodiment of a method for power control of UE transmissions.

FIG. 3 shows an embodiment of another method 300 for power control of UE transmissions. At step 310, a power level is signaled by a network to a UE. At step 320, a signal level parameter affecting or determining the power level at the UE is signaled to a base station. For instance, the RNC signals the UE an absolute DPCCH power level or an offset (delta_DPCCH) for adjusting the current DPCCH power at the UE. At about the same time, the RNC may also signal a macro NodeB an absolute SIR target value (SIR_target) or offset for adjusting the current SIR target at the NodeB. At step 330, the UE applies the indicated power level after N time slots from the TTI boundary when the UE received the signaling from the network. The value N is defined to be any suitable real value defining a time window after receiving the signal by the UE.

Figure 4:
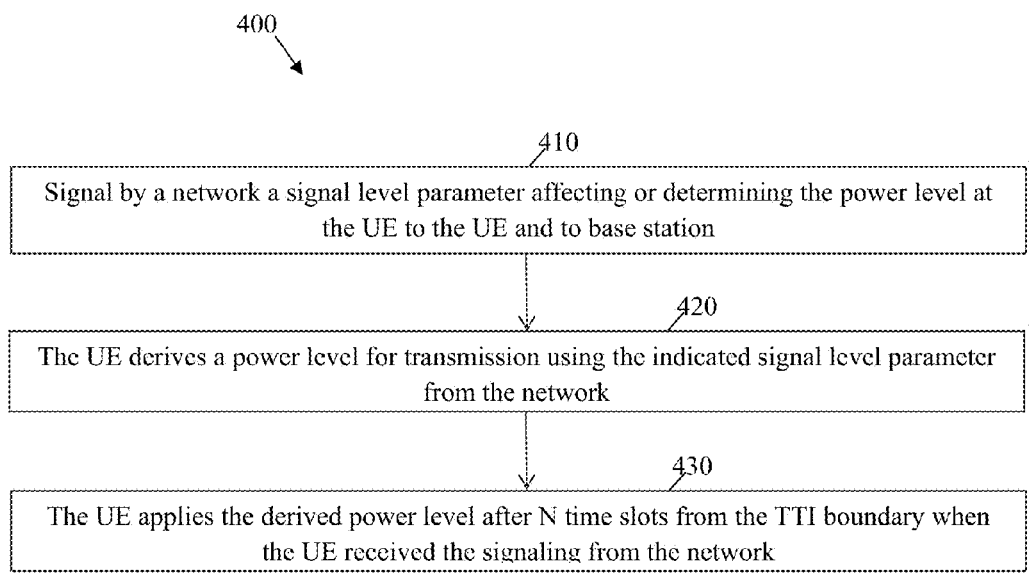
FIG. 4 illustrates another embodiment of a method for power control of UE transmissions.

FIG. 4 shows an embodiment of another method 400 for power control of UE transmissions. At step 410, a signal level parameter affecting or determining the power level at the UE is signaled by a network to the UE and to the base station. For instance, the RNC signals to the UE an absolute SIR target value (SIR_target) or offset for adjusting the transmission power level of DPCCH at the UE. At about the same time, the RNC also signals to the base station or NodeB an absolute SIR target value (SIR_target) or offset for adjusting the current SIR target at the NodeB. At step 420, the UE derives a power level for transmission using the indicated signal level parameter from the network. For instance, the UE calculates a delta_DPCCH equal to the received delta_SIR_target, an absolute DPCCH value equal to the received absolute SIR_target, or a function (e.g., a scalar) of delta_SIR_target or SIR_target. At step 430, the UE applies the derived power level after N time slots from the TTI boundary when the UE received the signaling from the network. The value N is any suitable real value defining a time window after receiving the signal by the UE.

Figure 5:
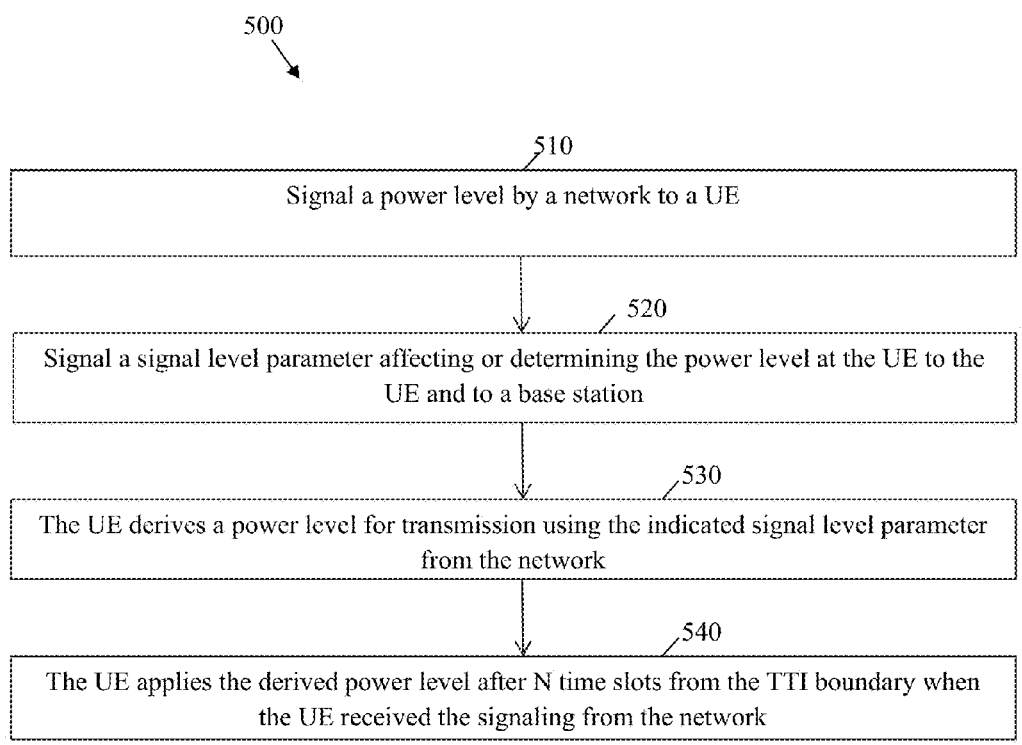
FIG. 5 illustrates another embodiment of a method for power control of UE transmissions.

FIG. 5 shows an embodiment of another method 500 for power control of UE transmissions. At step 510, a power level is signaled by a network to a UE. For instance, the RNC signals the UE an absolute DPCCH power level or an offset (delta_DPCCH) for adjusting the current DPCCH power at the UE. At step 520, a signal level parameter affecting or determining the power level at the UE is signaled to the UE and to a base station (at about the same time) by the network. For instance, the RNC signals to the UE an absolute SIR target value (SIR_target) or offset for adjusting the UE power. At about the same time, the RNC may also signal to a macro NodeB an absolute SIR target value (SIR_target) or offset for adjusting the current SIR target at the NodeB. At step 530, the UE derives a power level for transmission using the indicated signal level parameter (e.g., DPCCH power and SIR_target, or corresponding offsets) from the network. For instance, the UE calculates a delta_DPCCH equal to the received delta_SIR_target, an absolute DPCCH value equal to the received absolute SIR_target, or a function (e.g., a scalar) of delta_SIR_target or SIR_target. At step 540, the UE applies the derived power level after N time slots from the TTI boundary when the UE received the signaling from the network. The value N is any suitable real value defining a time window after receiving the signal by the UE.

The methods 200, 300, 400 and 500 can be implemented in a Hetnet, where a UE has a serving macro cell NodeB and LPN. The UE may be in a SHO area with imbalance between uplink and downlink, as in the scenario 100. Thus, the method 200 is used to adjust the transmission power of the UE on uplink to the NodeB. Alternatively, the methods 200, 300, 400 or 500 can be implemented in other wireless network technologies or scenarios to adjust the UE's transmission power to one of multiple serving base stations, for example, one of two or more macro NodeBs or LPNs.

Figure 6:
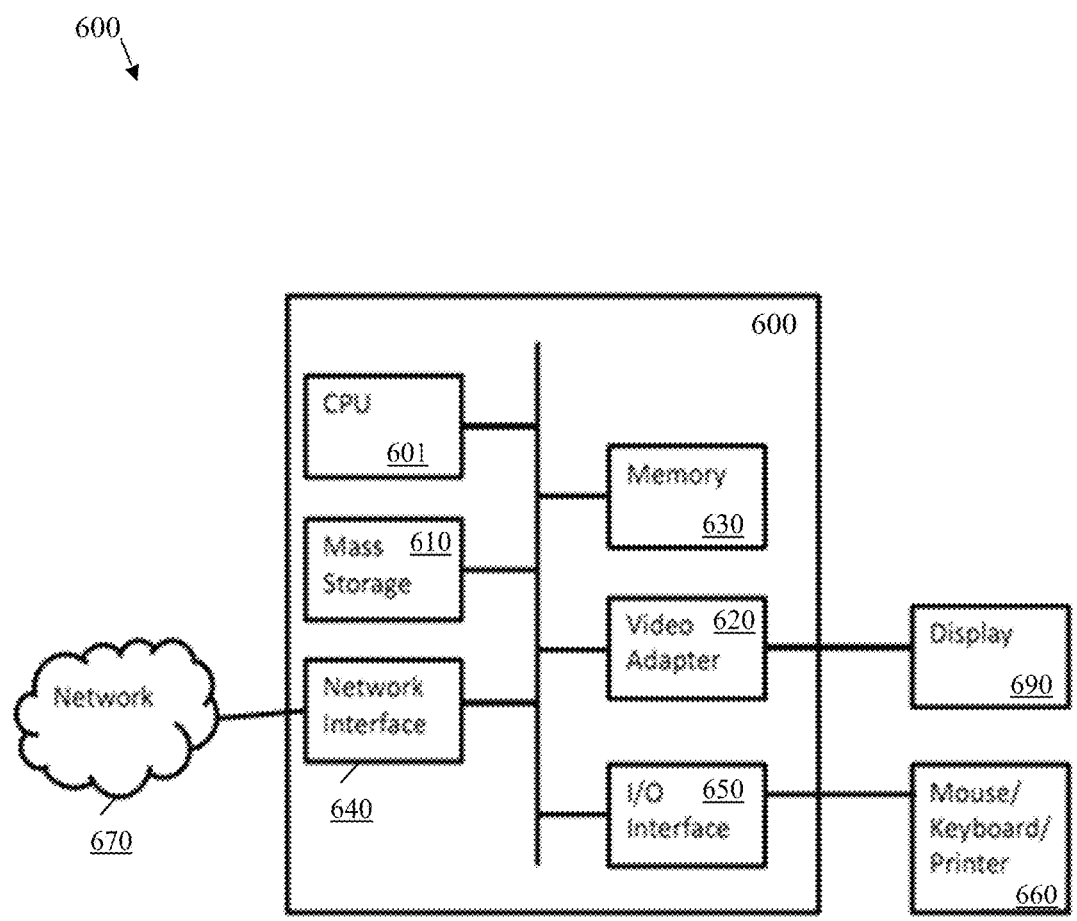
FIG. 6 is a diagram of a processing system that can be used to implement various embodiments.

FIG. 6 is a block diagram of an exemplary processing system 600 that can be used to implement various embodiments. The processing system is part of a communications system or component, such as a base station or a UE. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an Input/Output (I/O) interface 690 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 690 provide interfaces to couple external input and output devices to the processing unit. As illustrated, examples of input and output devices include a display 660 coupled to the video adapter 640 and any combination of mouse/keyboard/printer 670 coupled to the I/O interface 690. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a radio network controller (RNC) for adjusting a transmission power level at a user equipment (UE), the method comprising:
   sending, by the RNC, a first indication to the UE, wherein the first indication instructs the UE to adjust a transmission power level over an uplink dedicated physical control channel (DPCCH) from the UE to a base station, the RNC being different than the base station; and
   sending, by the RNC, a second indication to the base station, the second indication indicating an offset value for a signal to interference ratio (SIR) target for the base station over the uplink DPCCH, the second indication instructing the base station to adjust outer loop power control of the uplink DPCCH based on the offset value for the SIR target, the uplink DPCCH carrying pilot bits from the UE to the base station, wherein the UE transmits on uplink to the base station, the UE operating in a single-carrier mode such that the UE transmits all uplink signals over the same carrier frequency.

2. The method of claim 1, wherein the first indication indicates an absolute transmission power level for the uplink DPCCH.

3. The method of claim 1, wherein the first indication indicates an offset value for adjusting transmission power for the uplink DPCCH.

4. The method of claim 1, wherein the first indication indicates one of an absolute value and an offset value for an SIR target for the UE.

5. The method of claim 1, wherein the UE is in a soft handover (SHO) area between the base station and a low power node (LPN), at a closer distance to the LPN than the base station, in a heterogeneous network deployment.

6. The method of claim 1, wherein the first indication and the second indication are sent via radio resource control (RRC) signaling.

7. A radio network controller (RNC) for adjusting a transmission power level at a user equipment (UE), the RNC comprising:
   at least one processor; and
   a non-transitory computer readable storage medium storing programming for execution by the processor, the programming including instructions to:
   send, to the UE, a first indication, wherein the first indication instructs the UE to adjust a transmission power level over an uplink dedicated physical control channel (DPCCH) from the UE to a base station, the RNC being different than the base station; and
   send a second indication to the base station, the second indication indicating an offset value for a signal to interference ratio (SIR) target for the base station over the uplink DPCCH, the second indication instructing the base station to adjust outer loop power control of the uplink DPCCH based on the offset value for the SIR target, the uplink DPCCH carrying pilot bits from the UE to the base station, wherein the UE is located between the base station and a radio node and transmits on uplink to the base station, the UE operating in a single-carrier mode such that the UE transmits all uplink signals over the same carrier frequency.

8. The RNC of claim 7, wherein the UE is in a soft handover (SHO) area between the base station and a low power node (LPN), at a closer distance to the LPN than the base station, in a heterogeneous network deployment.

9. The RNC of claim 7, wherein the first indication and the second indication are sent via radio resource control (RRC) signaling.

10. A method comprising:
    receiving, by a base station, an indication from a radio network controller (RNC), wherein the indication specifies an offset value for a signal to interference ratio (SIR) target for the base station over an uplink dedicated physical control channel (DPCCH) between a user equipment (UE) and the base station, the indication instructing the base station to adjust outer loop power control of the uplink DPCCH based on the offset value for the SIR target, the uplink DPCCH carrying pilot bits from the UE to the base station, the RNC being different than the base station, and the UE operating in a single-carrier mode such that the UE transmits all uplink signals over the same carrier frequency;
    receiving, by the base station, an uplink transmission over the uplink DPCCH, wherein the UE is located between the base station and a radio node; and
    determining, by the base station, a power control parameter based on a measured SIR level of the uplink transmission received over the uplink DPCCH and the offset value for the SIR target specified by the indication received from the RNC.

11. The method of claim 10, wherein the first indication and the second indication are sent via radio resource control (RRC) signaling.

12. The method of claim 10, wherein the radio node is a low power node (LPN) and the base station is a macro cell NodeB, and wherein the UE is located in a soft handover (SHO) area between the macro cell NodeB and the LPN where a path loss from the UE to the macro cell NodeB is larger than to the LPN.

13. The method of claim 10, wherein the uplink transmission is transmitted after a predefined time period.

14. A base station comprising:
    at least one processor; and
    a non-transitory computer readable storage medium storing programming for execution by the processor, the programming including instructions to:
    receive, from a radio network controller (RNC), an indication specifying an offset value for a signal to interference ratio (SIR) target for the base station over an uplink dedicated physical control channel (DPCCH)

between a user equipment (UE) and the base station, the indication instructing the base station to adjust outer loop power control of the uplink DPCCH based on the offset value for the SIR target, the uplink DPCCH carrying pilot bits from the UE to the base station, and the UE operating in a single-carrier mode such that the UE transmits all uplink signals over the same carrier frequency;

receive, from the UE, an uplink transmission over the uplink DPCCH, wherein the UE is located between the base station and a radio node; and determine a power control parameter based on the uplink transmission received over the uplink DPCCH in accordance with the offset value for the SIR target specified by the indication received from the RNC.

15. The base station of claim 14, wherein the radio node is a low power node (LPN) and the base station is a macro cell NodeB, and wherein the UE is located in a soft handover (SHO) area between the macro cell NodeB and the LPN where a path loss from the UE to the macro cell NodeB is larger than to the LPN.

16. The base station of claim 14, wherein the base station is a NodeB and the radio node is a second NodeB, and wherein the UE is located between the NodeB and the second NodeB where a path loss from the UE to the NodeB is larger than to the second NodeB.

* * * * *